US009336469B2

(12) United States Patent
Ishizuka

(10) Patent No.: US 9,336,469 B2
(45) Date of Patent: May 10, 2016

(54) APPARATUS AND METHOD FOR COLOR CONVERSION FOR AN IMAGE PROCESSING APPARATUS BY EXTRACTING EMBEDDED COLOR SPACE INFORMATION

(71) Applicant: FUJI XEROX CO., LTD., Tokyo (JP)

(72) Inventor: Ryuichi Ishizuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/661,617

(22) Filed: Mar. 18, 2015

(65) Prior Publication Data
US 2015/0324672 A1 Nov. 12, 2015

(30) Foreign Application Priority Data

May 8, 2014 (JP) .................................. 2014-096951

(51) Int. Cl.
| | |
|---|---|
| G06K 15/02 | (2006.01) |
| H04N 1/00 | (2006.01) |
| H04N 1/60 | (2006.01) |
| H04N 1/32 | (2006.01) |

(52) U.S. Cl.
CPC ........ *G06K 15/1878* (2013.01); *G06K 15/1811* (2013.01); *G06K 15/1822* (2013.01); *G06K 15/1886* (2013.01); *H04N 1/32149* (2013.01); *H04N 1/32309* (2013.01); *H04N 1/6016* (2013.01); *H04N 1/6058* (2013.01)

(58) Field of Classification Search
None
See application file for complete search history.

(56) References Cited

U.S. PATENT DOCUMENTS

| | | | | |
|---|---|---|---|---|
| 7,209,261 B2* | 4/2007 | Krueger | ................ | H04N 1/603 358/1.9 |
| 7,298,527 B2* | 11/2007 | Yabe | ...................... | H04N 1/603 358/1.9 |

(Continued)

FOREIGN PATENT DOCUMENTS

| | | |
|---|---|---|
| JP | 2002-152543 A | 5/2002 |
| JP | 2004-058587 A | 2/2004 |

(Continued)

OTHER PUBLICATIONS

International Color Consortium, Specification ICC.1:2010 (Profile version 4.3.0.0), Image Technology Colour Management—Architecture, Profile Format, and Data Structure. [Revision of ICC.1:2004-10].

(Continued)

*Primary Examiner* — Scott A Rogers
(74) *Attorney, Agent, or Firm* — Oliff PLC

(57) ABSTRACT

A non-transitory computer readable medium storing a program causing a computer to execute a process, the process including extracting first color space information from first image data in which the first color space information and n-color values in a first color space are described in a page description language, the first color space information being information for determining the first color space, which is a target, generating a color conversion profile in accordance with the first and second color space information, the second color space information being information for determining a second color space corresponding to output characteristics of an image output device that outputs second image data generated from the first image data, and converting the n-color values in the first color space into n-color values in the second color space in accordance with the color conversion profile.

12 Claims, 14 Drawing Sheets

(56) References Cited

U.S. PATENT DOCUMENTS

| | | | |
|---|---|---|---|
| 2002/0118380 A1* | 8/2002 | Krueger | G06K 15/1848 358/1.9 |
| 2004/0239965 A1* | 12/2004 | Krueger | G06K 15/1825 358/1.9 |
| 2013/0057881 A1* | 3/2013 | Nishide | H04N 1/54 358/1.9 |
| 2015/0256717 A1* | 9/2015 | Yamada | H04N 1/6019 358/3.23 |

FOREIGN PATENT DOCUMENTS

| | | |
|---|---|---|
| JP | 2008-228018 A | 9/2008 |
| JP | 2011-130230 A | 6/2011 |

OTHER PUBLICATIONS

PostScript Language Reference, Third Edition, Addison-Wesley Publishing Company, 1999.

* cited by examiner

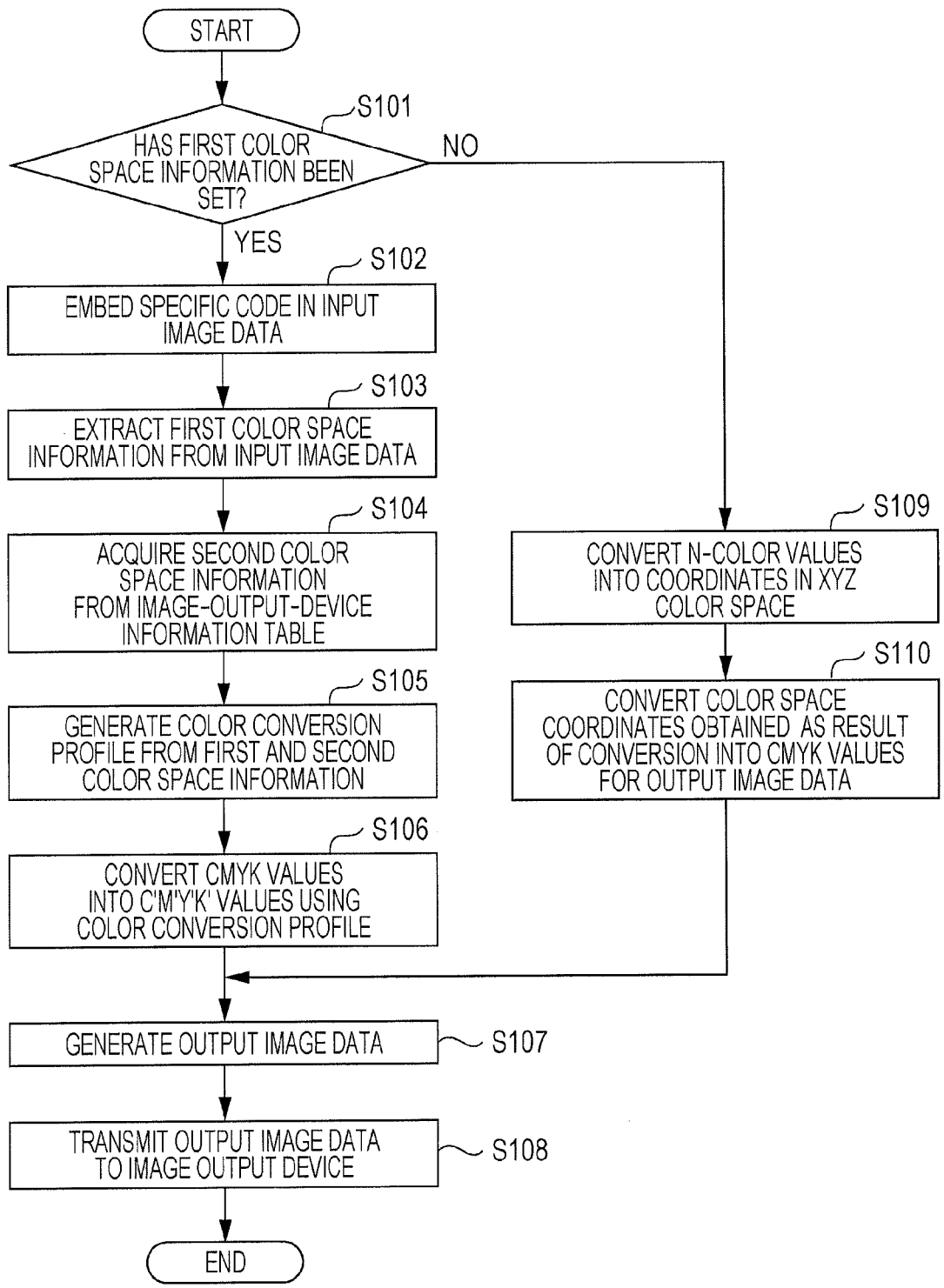

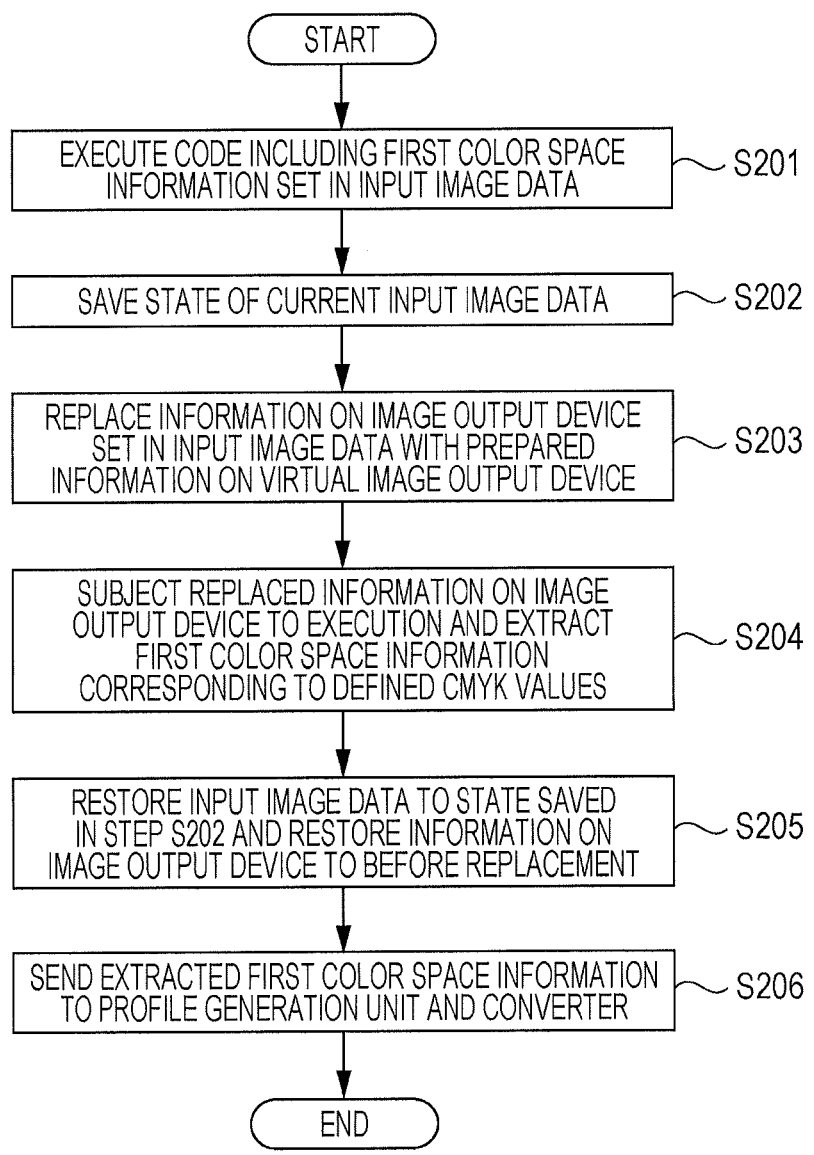

FIG. 5A

CODE A

```
%!PS-Adobe-3.0 Resource-ColorRendering
<<
/Renderingintent (RelativeColorimetric)
/Description (GETXYZ)
/ColorSpace (CMYK)
/ColorRenderingType 1
/CRDName (GETXYZ)

/MatrixPQR
[1 0 0
 0 1 0
 0 0 1]

/RangePQR
[0 2 0 1 0 5]

/TransformPQR
[
{5 1 roll pop exch pop 0 get exch 0 get div mul}
{5 1 roll pop exch pop 1 get exch 1 get div mul}
{5 1 roll pop exch pop 2 get exch 2 get div mul}
]

/MatrixLMN
[1 0 0
 0 1 0
 0 0 1]

/WhitePoint
[0.9505  1.0000 1.089]

/BlackPoint
[0.000000     0.000000     0.000000     ]

%COORDINATE INFORMATION IN FIRST COLOR SPACE IS WRITTEN IN FILE.
/EncodeLMN
[
{dup (TMP/XYZ.txt) (a+) file dup ( ) writestring exch 20 string cvs [ index exch writestring closefile}
{dup (TMP/XYZ.txt) (a+) file dup ( ) writestring exch 20 string cvs [ index exch writestring closefile}
{dup (TMP/XYZ.txt) (a+) file dup ( ) writestring exch 20 string cvs [ index exch writestring dup (\r\n)
writestring closefile}
]

/RangeLMN
[0 2 0 1 0 5]
```

A1 encompasses the /EncodeLMN block.

FIG. 5B

CODE A

/MatrixABC
[
1 0 0
0 1 0
0 0 1
]

/EncodeABC
[{ }{ }{ }]

/RangeABC
[0 1 0 1 0 1]

/RenderTable
[
2 2 2 [
<
0000 0000 0000 FF00
00FF 0000 00FF FF00
>
<
FF00 0000 FF00 FF00
FFFF 0000 FFFF FF00
>
]
4
% cyan output tables (X)
{255 mul 0.5 add cvi 255 div} bind
% magenta output tables (Y)
{255 mul 0.5 add cvi 255 div} bind
% yellow output tables (Z)
{255 mul 0.5 add cvi 255 div} bind
% black output tables
{255 mul 0.5 add cvi 255 div} bind
]
>>

/FXGETXYZ exch /ColorRendering defineresource pop
%%EndResource

FIG. 6A

CODE B

```
%!PS
%
% INFORMATION ON IMAGE OUTPUT DEVICE IS SET
% ThisPrinter IS PREDEFINED INFORMATION ON IMAGE OUTPUT DEVICE
/ThisPrinter /ColorRendering findresource setcolorrendering % FIRST COLOR SPACE INFORMATION IS WRITTEN
/setcolorspace {                                                          ←——— B1
% PREPARED FIRST COLOR SPACE INFORMATION IS SET
setcolorspace
%STATE OF INPUT IMAGE DATA IS SAVED
gsave                                                                     ←——— B2
% CHARACTERISTICS OF IMAGE OUTPUT DEVICE ARE REPLACED
WITH INFORMATION ON VIRTUAL IMAGE OUTPUT DEVICE REGISTERED
IN Resource/ColorRendering FOLDER
/FXGETXYZ /ColorRendering findresource setcolorrendering                  ←——— B3
{(TMP/XYZ.txt) deletefile} stopped {pop} if %DATA FOR EXTRACTING FIRST COLOR SPACE INFORMATION
[
0.000  0.000  0.000  0.000
0.000  0.000  0.000  0.125
0.000  0.000  0.000  0.250
...OMITTED...                  } B4
1.000  1.000  1.000  0.750
1.000  1.000  1.000  0.875
1.000  1.000  1.000  1.000
]
%FIRST COLOR SPACE INFORMATION DATA ARE EXTRACTED.
dup length 4 div 1 sub 0 1 3 -1 roll
{4 mul dup 2 index exch get 1 index 1 add 3 index exch get 2 index 2 add 4 index exch get  } B5
 3 index 3 add 5 index exch get setcolor pop} for
pop
%INPUT IMAGE DATA IS RESTORED TO SAVED STATE AND INFORMATION
ON IMAGE OUTPUT DEVICE IS RESTORED TO PREVIOUS INFORMATION.
grestore                                                                  ←——— B6
%SETTING IS PERFORMED SUCH THAT PREPARED COLOR CORRECTION
FUNCTION IS NOT USED.
/DeviceCMYK setcolorspace                                                 ←——— B7
%EXTRACTED FIRST COLOR SPACE INFORMATION IS SET IN PROFILE
GENERATION UNIT AND CONVERTER.
(SetExternalCMYK) (TMP/XYZ.txt) externalcommand pop cvx exec              ←——— B8
} bind def
```

FIG. 6B

CODE C

```
% FROM HERE ON, JOB

% SETTINGS OF FIRST COLOR SPACE INFORMATION
% CMYK Color Space
[/CIEBasedDEFG
<<<
/BlackPoint [0.0158600165 0.0164488375 0.0135687348]
/WhitePoint [0.9642028809 1 0.8249053955]
/Table [9 9 9 [
[<FE8080E47F7FCB7F7FB17F7F97807F7D80806480804A8180308282FC7D8CE27D8AC87E89
...OMITTED...
3F7B7C397C7D337D7D2D7E7E287F7E237F7F1E807F1A8180178280>
]]]
/DecodeABC [
{(0 0.00392 0.00784 ...OMITTED... } dup 3 -1 roll 0 1 3 copy ...OMITTED... } bind
{(0 0.00391 0.00781 ...OMITTED... } dup 3 -1 roll 0 1 3 copy ...OMITTED... } bind
{(0 0.00391 0.00781 ...OMITTED... } dup 3 -1 roll 0 1 3 copy ...OMITTED... } bind
]
/MatrixABC [0.625 0.625 0.625 0.3712 0 0 0 0 -0.928]
/MatrixLMN [1.9999694824 0 0 0 1.9999694824 0 0 0 1.9999694824]
/RangeLMN [0 1.1856 0 1 -0.464 1]
/DecodeLMN ]
{-0.1856 add 100 mul 0.625 div dup 8 1e {27 24389 div mul} {16 add 1 16 div dup dup mul mul} ifelse
0.4821087968 mul} bind
{100 mul 0.625 div dup 8 1e {27 24389 div mul} {16 add 1 16 div dup dup mul mul} ifelse
0.5000076295 mul} bind
{0.464 add 100 mul 0.625 div dup 8 1e {27 24389 div mul} {16 add 1 16 div dup dup mul mul} ifelse
0.4124589914 mul} bind
]
>>
] setcolorspace
```

FIG. 7

0.953267 0.999908 1.08076
0.717991 0.757892 0.832203
0.535432 0.56538 0.621343
...OMITTED...
0.0132634 0.013781 0.0154855
0.0114413 0.0115696 0.0121862
0.0102597 0.0100758 0.010596

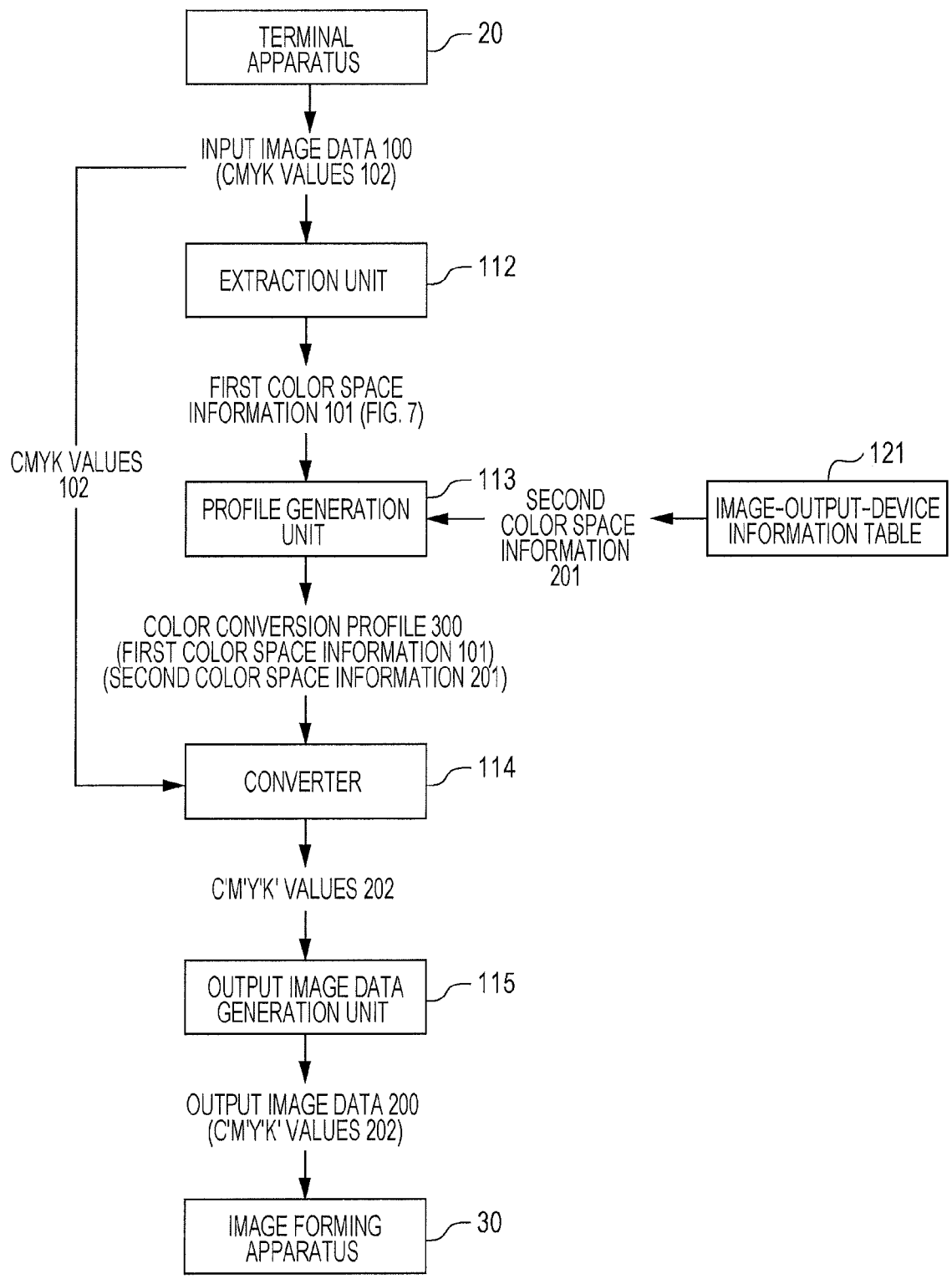

FIG. 10A

CODE D

```
%!PS
%
currentglobal true setglobal
%
%ORIGINAL COLOR SETTING FUNCTION IS SAVED
systemdict /setcolorspace get /org_setcolorspace exch def %INPUT-CHARACTERISTIC WRITE PROCESS IS DEFINED FOR CMYK
/setcolorspaceCMYK {
%PREPARED FIRST COLOR SPACE IS SET
setcolorspace
%STATE OF INPUT IMAGE DATA IS SAVED
gsave
%INFORMATION ON IMAGE OUTPUT DEVICE IS REGISTERED IN Resource/
ColorRendering FOLDER AND IS REPLACED WITH INFORMATION ON VIRTUAL
IMAGE OUTPUT DEVICE
/FXGETXYZ /ColorRendering findresource setcolorrendering
{(TMP/XYZ.txt) deletefile} stopped {pop} if %DATA FOR EXTRACTING INPUT-CHARACTERISTIC DATA
[
0.000  0.000  0.000  0.000
0.000  0.000  0.000  0.125
0.000  0.000  0.000  0.250
...OMITTED...
1.000  1.000  1.000  0.750
1.000  1.000  1.000  0.875
1.000  1.000  1.000  1.000
]
%COORDINATE INFORMATION IN FIRST COLOR SPACE IS EXTRACTED.
dup length 4 div 1 sub 0 1 3 -1 roll
{4 mul dup 2 index exch get 1 index 1 add 3 index exch get 2 index 2 add 4 index exch get
 3 index 3 add 5 index exch get setcolor pop} for
pop
%INPUT IMAGE DATA IS RESTORED TO SAVED STATE AND INFORMATION ON IMAGE
OUTPUT DEVICE IS RESTORED TO PREVIOUS INFORMATION.
grestore
%SETTING IS PERFORMED SUCH THAT PREPARED COLOR CORRECTION FUNCTION
IS NOT USED.
/DeviceCMYK setcolorspace
%EXTRACTED FIRST COLOR SPACE INFORMATION IS SET IN PROFILE GENERATION
UNIT AND CONVERTER.
%(SetExternalCMYK) (TMP/XYZ.txt) externalcommand pop cvx exec
} bind def
```

FIG. 10B

CODE E

```
%IN THE CASE OF CMYK (/CIEBasedDEFG) WHEN setcolorspace IS EXECUTED,
%INPUT-CHARACTERISTIC DATA IS EXTRACTED AND EXTERNAL CMM (COLOR
MANAGEMENT MODULE) IS USED
/setcolorspace {
  %COORDINATE INFORMATION IN FIRST COLOR SPACE IS WRITTEN
  %WHETHER OR NOT COORDINATE INFORMATION IS INCLUDED
  dup type (arraytype) eq
  {
    %WHETHER FIRST COLOR SPACE INFORMATION IS SET IN INPUT IMAGE DATA
    dup 0 get
    /CIEBasedDEFG eq
    {
    %IF FIRST COLOR SPACE INFORMATION IS SET, COORDINATE INFORMATION IS
    EXTRACTED
    setcolorspaceCMYK
    }
    {
    %IF FIRST COLOR SPACE INFORMATION IS NOT SET, PRESET COLOR SPACE SETTING
    FUNCTION IS EXECUTED.
    org_setcolorspace
    }
    ifelse
  }
  {
    %IN CASE WHERE SPECIFICATION IS PERFORMED USING NAME THAT DOES NOT INCLUDE
    COORDINATE INFORMATION, PRESET COLOR SPACE SETTING FUNCTION IS EXECUTED.
    org_setcolorspace
  }
  ifelse
} bind def
setglobal
```

APPARATUS AND METHOD FOR COLOR CONVERSION FOR AN IMAGE PROCESSING APPARATUS BY EXTRACTING EMBEDDED COLOR SPACE INFORMATION

CROSS-REFERENCE TO RELATED APPLICATIONS

This application is based on and claims priority under 35 USC 119 from Japanese Patent Application No. 2014-096951 filed May 8, 2014.

BACKGROUND

Technical Field

The present invention relates to a non-transitory computer readable medium, a color conversion apparatus, and a color conversion method.

SUMMARY

According to an aspect of the invention, there is provided a non-transitory computer readable medium storing a program causing a computer to execute a process, the process including extracting first color space information from first image data in which the first color space information and n-color values in a first color space are described in a page description language, the first color space information being information for determining the first color space, which is a target, generating a color conversion profile in accordance with the first color space information and second color space information, the first color space information being extracted in the extracting, the second color space information being information for determining a second color space corresponding to output characteristics of an image output device that outputs second image data generated from the first image data, and converting the n-color values in the first color space into n-color values in the second color space in accordance with the color conversion profile.

BRIEF DESCRIPTION OF THE DRAWINGS

Exemplary embodiments of the present invention will be described in detail based on the following figures, wherein:

FIG. 3 is a flowchart illustrating an example of an operation of the server apparatus;

FIG. 4 is a flowchart illustrating an example of an operation of an extraction unit;

FIGS. 5A and 5B are diagrams illustrating a code indicating an example of output characteristics of a virtual image output device, the code being described in a page description language;

FIG. 6A is a diagram illustrating an example of a code inserted into input image data described in a page description language;

FIG. 6B is a diagram illustrating an example of a code including first color space information described in a page description language;

FIG. 7 is a diagram illustrating an example of extracted first color space information;

FIG. 9 is a block diagram for explaining a function of a server apparatus;

FIGS. 10A and 10B illustrate codes inserted into an interpreter and described in a page description language, FIG. 10A being a diagram illustrating a code for extracting the first color space information, FIG. 10B being a diagram illustrating a code for calling the code of FIG. 10A.

DETAILED DESCRIPTION

Figure 1:
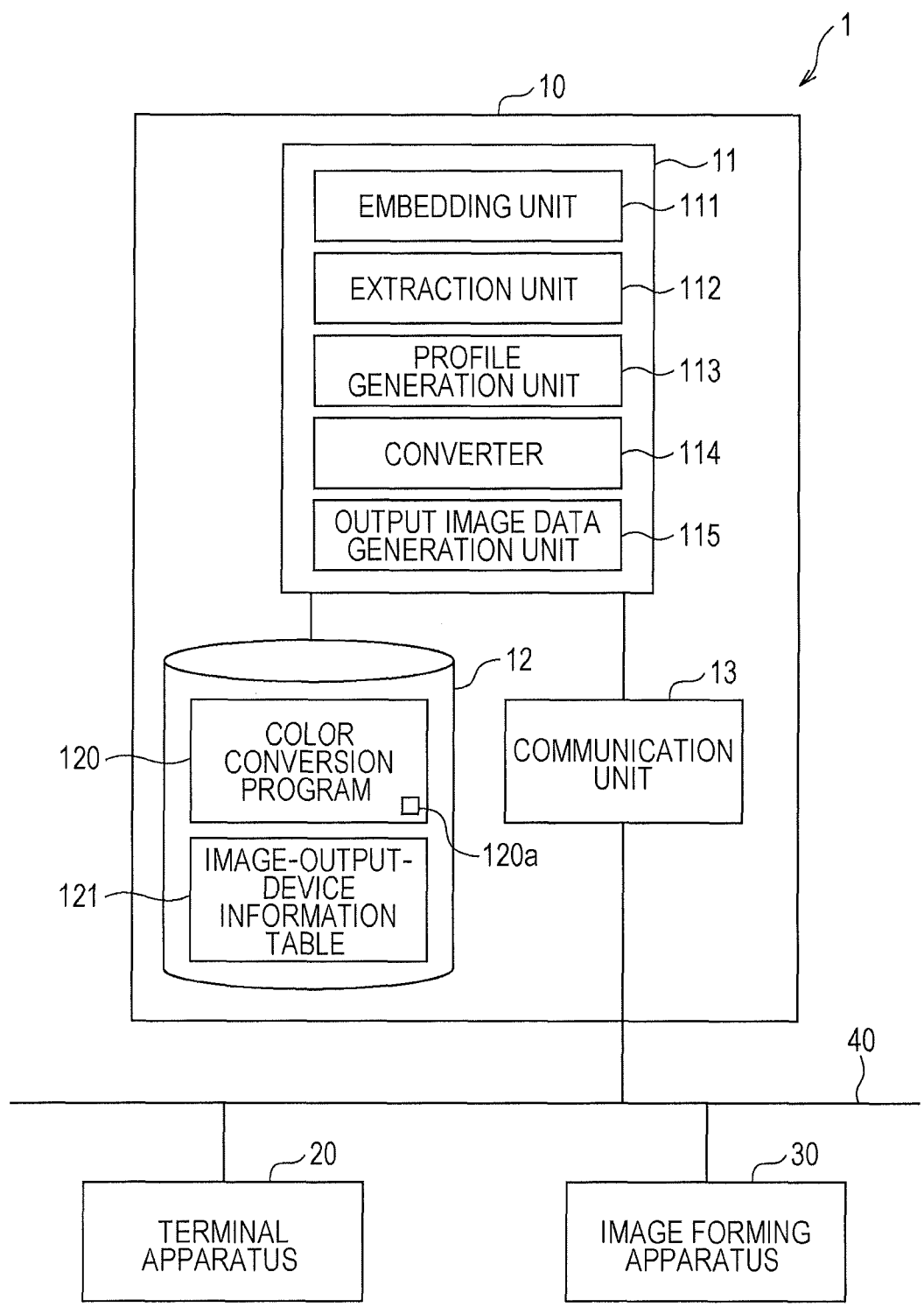
FIG. 1 is a block diagram illustrating an example of a schematic configuration of a printing system according to a first exemplary embodiment of the present invention.

In the following, exemplary embodiments of the present invention will be explained with reference to the drawings. Note that, in the drawings, elements having substantially the same function are denoted by the same reference numeral and a redundant explanation thereof will be omitted.

[First Exemplary Embodiment]

FIG. 1 is a block diagram illustrating an example of a schematic configuration of a printing system according to a first exemplary embodiment of the present invention.

A printing system 1 includes a terminal apparatus 20, a server apparatus 10, and an image forming apparatus 30. The terminal apparatus 20 generates image data (hereinafter referred to as "input image data") 100. The server apparatus 10 converts, in accordance with output characteristics of the image forming apparatus 30, n-color values, for example, four-color values included in the generated input image data 100 using a color conversion profile 300, which will be described later, and generates image data (hereinafter referred to as "output image data") 200 in accordance with four-color values obtained after conversion. The image forming apparatus 30 receives the output image data 200 from the server apparatus 10 and outputs a printed material. The terminal apparatus 20 and the image forming apparatus 30 are connected to a network 40 so as to be able to communicate with the server apparatus 10 with each other in a wired or wireless manner.

Note that FIG. 1 illustrates one image forming apparatus 30; however, plural image forming apparatuses 30 may also be connected to the network 40. The server apparatus 10 may have a function of the terminal apparatus 20. The server apparatus 10 is an example of a color conversion apparatus, the image forming apparatus 30 is an example of an image output device, and an image output device may be a display such as a liquid crystal display or the like. Input image data are an example of first image data, and output image data are an example of second image data.

The input image data 100 and the output image data 200 are data written in a page description language (PDL) (PDL data), examples of a PDL including Postscript®, ART, PCL, and Interpress, and include, for example, data specifying colors of figures and the like, data for commanding drawing of figures and the like, and image objects. The input image data 100 is interpreted by an interpreter 120a stored in a memory 12 of the server apparatus 10, and the output image data 200 is generated by performing a color conversion process, an output image data generation process, and the like in accordance with an interpretation made by the interpreter 120a.

Note that in the following explanation, four colors are explained as CMYK, which are C (cyan), M (magenta), Y (yellow), and K (black); however, colors other than K (black)

may be arbitrary colors. Alternatively, five colors or more including K (black) may be used. Alternatively, n-color values may be represented in a color representation method as RGB (red, green, blue) values or the like in addition to CMYK values.

The terminal apparatus 20 is constituted by, for example, a personal computer (PC) and the like, and generates the input image data 100 including color information represented as CMYK values 102 or RGB values from an image obtained from an optical device such as a camera, a scanner, or the like, an image of a computer graphics (an image created by a computer), or the like.

The image forming apparatus 30 is, for example, an image forming apparatus that forms toner images on sheets using an electrophotographic system. The image forming apparatus 30 generates print data in accordance with the output image data 200 output from the server apparatus 10, and forms toner images on sheets in accordance with the print data. Note that the image forming apparatus 30 may also be an image forming apparatus that forms images by ejecting ink to sheets using an ink-jet system or an image forming apparatus that forms images on sheets using another system.

(Configuration of Server Apparatus)

The server apparatus 10 includes a controller 11 realized by a central processing unit (CPU) or the like, the memory 12 realized by a read-only memory (ROM), a random-access memory (RAM), a hard disk, or the like, and a communication unit 13 that communicates with the terminal apparatus 20 and the image forming apparatus 30 via the network 40.

The CPU of the controller 11 functions as an embedding unit 111, a profile generation unit 113, a converter 114, an output image data generation unit 115, and the like by operating in accordance with a program stored in the memory 12. The functions of the embedding unit 111, an extraction unit 112, the profile generation unit 113, the converter 114, and the output image data generation unit 115 will be described later. In addition, the CPU of the controller 11 functions as the extraction unit 112 by operating in accordance with an extraction instruction code embedded in the input image data 100. Note that the extraction instruction code is an example of a specific code.

The memory 12 stores various types of programs such as a color conversion program 120, various types of data such as an image-output-device information table 121, and the like. In the image-output-device information table 121, second color space information 201 is registered such that the second color space information 201 corresponds to identification information such as the name or the like of the image forming apparatus 30 (plural image forming apparatuses 30 in the case where the plural image forming apparatuses 30 are connected to the network 40).

A second color space is a three-dimensional color space represented by an XYZ color system, an L*a*b* color system, or the like corresponding to characteristics of color materials such as toner or the like used by the image forming apparatus 30 (hereinafter referred to as "output characteristics"). The second color space information 201 for determining the second color space is generated by, for example, measuring colors of an image on a sheet output from the image forming apparatus 30 with a colorimeter.

(Function of Server Apparatus)

Figure 2:
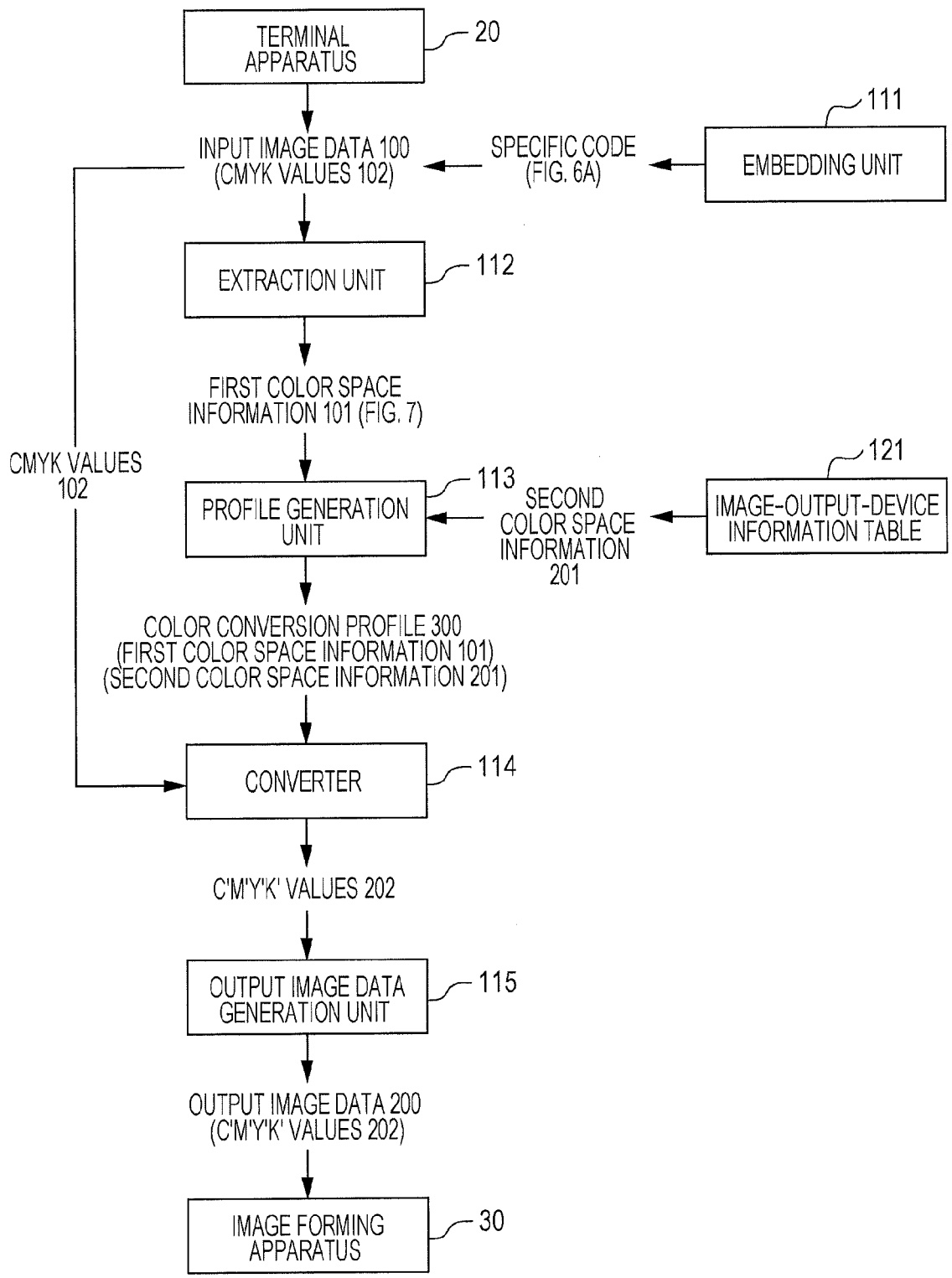
FIG. 2 is a block diagram for explaining a function of a server apparatus.

FIG. 2 is a block diagram for explaining a function of the server apparatus 10.

In the input image data 100, which is input to the server apparatus 10 from the terminal apparatus 20, first color space information 101 and the CMYK values 102 in a first color space are described in a page description language. The first color space information 101 is information for determining the first color space, which is a target.

The embedding unit 111 embeds, in the input image data 100, an extraction instruction code (a code B illustrated in FIG. 6A) serving as an example of a specific code for instructing extraction of the first color space information 101.

The extraction unit 112 extracts, as illustrated in FIG. 2, the first color space information 101 (see FIG. 7) from the input image data 100 in accordance with the extraction instruction code embedded in the input image data 100.

Here, the first color space is a three-dimensional color space represented by an XYZ color system, an L*a*b* color system, or the like corresponding to a profile, examples of which include Japan Color, which is a standard printing protocol, Fogra, General Requirements for Applications in Commercial Offset Lithography (GRACol), and Specifications Web Offset Printing (SWOP).

In addition, the first and second color space information 101 and 201 are coordinate information in an XYZ color system, an L*a*b* color system, or the like corresponding to plural colors specified as CMYK values (for example, 928 colors, 1188 colors, 1484 colors, or the like), and are information for determining the first and second color spaces, respectively.

The profile generation unit 113 generates the color conversion profile 300 from the first color space information 101 extracted by the extraction unit 112 and the second color space information 201 read from the image-output-device information table 121.

The color conversion profile 300 includes a look-up table generated in accordance with the first color space information 101 and the second color space information 201. The second color space information 201 is information for determining a second color space corresponding to output characteristics of the image forming apparatus 30.

The converter 114 converts, in accordance with the color conversion profile 300 generated by the profile generation unit 113, the CMYK values 102 in the first color space into C'M'Y'K' values 202 in the second color space such that the first color space is reproduced with a targeted high accuracy in terms of individual colors in the first color space, especially K (black).

The output image data generation unit 115 generates the output image data 200 in accordance with the C'M'Y'K' values 202 in the second color space obtained as a result of conversion.

(Operation of Printing System)

Next, an example of an operation of the printing system 1 will be explained. FIG. 3 is a flowchart illustrating an example of an operation of the server apparatus 10.

A user generates the input image data 100, which has n-color values (for example, the CMYK values 102, RGB values, or the like) by operating the terminal apparatus 20. Here, the terminal apparatus 20 inserts, into the input image data 100, identification information such as the name or the like of the image forming apparatus 30 selected by the user through an operation screen or the like of the terminal apparatus 20. Subsequently, the user performs an operation for instructing the terminal apparatus 20 to perform printing of images represented by the input image data 100. The terminal apparatus 20 transmits the input image data 100 to the server apparatus 10 via the network 40 in accordance with the instruction from the user. Note that the identification information such as the name or the like of the image forming apparatus 30 may be omitted. In the case where the identification information is omitted, default information on the image forming apparatus 30 set in the server apparatus 10 may also be used.

When the communication unit 13 of the server apparatus 10 receives the input image data 100, the extraction unit 112 determines whether or not the first color space information 101 is set in the input image data 100 (S101). In the case where the first color space information 101 is set in the input image data 100 (Yes in S101), the embedding unit 111 determines that the n-color values included in the input image data 100 are represented as the CMYK values 102 and embeds, in the input image data 100, the extraction instruction code (the code B illustrated in FIG. 6A) for instructing extraction of the first color space information 101 (S102).

Note that in the case where, for example, the user selects a profile, examples of which include a standard color protocol, by operating the terminal apparatus 20 when the user generates the input image data 100 by operating the terminal apparatus 20, the first color space information 101 is embedded in the input image data 100 in accordance with the profile. In the case where the user does not select a profile, examples of which include the standard color protocol, the first color space information 101 is not embedded in the input image data 100.

The extraction unit 112 extracts the first color space information 101 from the input image data 100 in accordance with the extraction instruction code embedded in the input image data 100 (S103). A detailed operation of the extraction unit 112 in the case of extraction of the first color space information 101 from the input image data 100 will be described later.

The profile generation unit 113 of the server apparatus 10 acquires the second color space information 201 corresponding to the identification information of the image forming apparatus 30 selected by the user from the image-output-device information table 121 (S104). Note that the server apparatus 10 may recognize the image forming apparatus 30 connected to the network 40, and the profile generation unit 113 may acquire the second color space information 201 corresponding to the image forming apparatus 30 from the image-output-device information table 121.

The profile generation unit 113 generates the color conversion profile 300 from the first color space information 101 extracted from the input image data 100 and the second color space information 201 corresponding to the image forming apparatus 30 (S105). The converter 114 converts the CMYK values 102 in the first color space into the C'M'Y'K' values 202 in the second color space using the generated color conversion profile 300 (S106).

Generation of the color conversion profile 300 and conversion of the CMYK values 102 using the color conversion profile 300 are performed, for example, using techniques disclosed in Japanese Unexamined Patent Application Publication No. 2002-152543. That is, the profile generation unit 113 generates, from the first color space information 101 and the second color space information 201, the color conversion profile 300 having a four-dimensional look-up table for converting the CMYK values 102 and one-dimensional look-up tables for converting tones of CMYK colors. Furthermore, when the four-dimensional look-up table is generated, the profile generation unit 113 makes it possible, for the output image data 200, to faithfully reproduce individual colors, especially K (black), from the CMYK values 102 included in the input image data 100 by realizing not only absolute colorimetric matching but also partial colorimetric matching.

In the case where the extraction unit 112 determines that the first color space information 101 is not included in the input image data 100 (No in S101), when the output image data generation unit 115 determines, with reference to a color space name included in the input image data 100, that the n-color values included in the input image data 100 are represented as, for example, RGB values, the output image data generation unit 115 converts the RGB values into coordinate information in a three-dimensional space such as the XYZ color system or the like (S109) and further converts the coordinate information obtained as a result of conversion into CMYK values corresponding to the image forming apparatus 30 (S110). Note that the output image data generation unit 115 may also convert RGB values or the like into CMYK values in accordance with a simple arithmetic expression, without using the XYZ color system.

Note that in the case where the extraction unit 112 determines that the first color space information 101 is not included in the input image data 100 (No in S101) and the n-color values are represented as the CMYK values 102, the output image data generation unit 115 may also convert the CMYK values 102 into the C'M'Y'K' values 202 in accordance with a simple computational expression without using the color conversion profile 300.

The output image data generation unit 115 generates the output image data 200 from the C'M'Y'K' values 202 obtained as a result of conversion in step S106 or the CMYK values obtained as a result of conversion in step S110 (S107). The communication unit 13 of the server apparatus 10 transmits the generated output image data 200 to the image forming apparatus 30 (S108), and the image forming apparatus 30 outputs a printed material in accordance with the received output image data 200.

(Operation for Extracting First Color Space Information)

Next, an example of an operation of the controller 11 for extracting the first color space information 101 will be explained in details. FIG. 4 is a flowchart illustrating an example of an operation of the extraction unit 112. FIGS. 5A and 5B are diagrams illustrating a code indicating an example of output characteristics of a virtual image output device, the code being described in a page description language. FIG. 6A is a diagram illustrating an example of a code inserted into input image data described in a page description language, and FIG. 6B is a diagram illustrating an example of a code including first color space information described in a page description language. FIG. 7 is a diagram illustrating an example of extracted first color space information.

In the following, an example will be explained in which a code that causes the controller 11 to function as the extraction unit 112 is described in Postscript as a page description language; however, the code does not have to be described in Postscript and may also be described in a page description language such as ART, PCL, Interpress, or the like.

First, as a preparation for extraction of the CMYK values 102 in the first color space from the input image data 100, the server apparatus 10 stores a file in which a code A illustrated in FIGS. 5A and 5B is described, in a specific folder (for example, Resource/ColorRendering). The code A is a code in which the output characteristics of a virtual image output device are described for performing setting in the input image data 100.

The extraction unit 112 is operated as in the following by the extraction instruction code (the code B) embedded in the input image data 100 in accordance with the flowchart illustrated in FIG. 4. That is, the extraction unit 112 sets the first color space information 101 included in the input image data 100, in accordance with a color space setting function (a code B1 illustrated in FIG. 6A, S201). Here, the extraction unit 112 calculates the first color space information 101, namely coordinates corresponding to the CMYK values 102 in the XYZ color system, by executing a code C. The code B includes, as illustrated in FIG. 6A, the code B1 and codes B2 to B8.

Note that the input image data 100 is described, as the code C of FIG. 6B, in a format (an arithmetic expression) in which the first color space information 101 is calculated at the time when the input image data 100 are executed.

Upon setting the first color space information 101, the extraction unit 112 saves the state of the input image data 100 in which identification information such as the name or the like of the image forming apparatus 30 (for example, This-Printer) is set in the input image data 100 (the code B2 illustrated in FIG. 6A, S202). After saving the state of the input image data 100, the extraction unit 112 replaces the information on the image forming apparatus 30 set in the input image data 100 with the output characteristics of the virtual image output device (the code A illustrated in FIGS. 5A and 5B) prepared as described above (the code B3 illustrated in FIG. 6A, S203).

The extraction unit 112 extracts the first color space information 101 corresponding to the CMYK values 102 defined in the code B4 illustrated in FIG. 6A from the input image data 100 (the code B5 illustrated in FIG. 6A, S204). That is, for each row of the code B4, the extraction unit 112 executes the code A, extracts coordinates in, for example, the XYZ color system corresponding to the row of the code B4, and writes the extracted coordinates corresponding to the row of the code B4 in a file in accordance with a code A1 illustrated in FIG. 5A. Note that the extracted first color space information 101 is represented as coordinates in, for example, the XYZ color system as illustrated in FIG. 7.

Upon extracting the first color space information 101, the extraction unit 112 restores the input image data 100 saved in step S202 and restores information on the virtual image output device, the information having been set to extract the first color space information 101, to previous information on the image forming apparatus 30 (the code B6 illustrated in FIG. 6A, S205).

When the information on the image forming apparatus 30 is restored, the extraction unit 112 sets a color correction process to "not execute" (the code B7 illustrated in FIG. 6A), the color correction process being preset in an environment where a page description language such as Postscript or the like is executed, and sends the first color space information 101 extracted in step S204 to the profile generation unit 113 and the converter 114 (the code B8 illustrated in FIG. 6A, S206).

As described above, conversion of the CMYK values 102 using the color conversion profile 300 becomes possible by extracting the first color space information 101 from the input image data 100. Thus, it becomes possible to convert the CMYK values 102 in the first color space into the C'M'Y'K' values 202 corresponding to the output characteristics of the image forming apparatus 30, and characteristics of individual colors of CMYK in the input image data 100, especially K (black), may be maintained.

[Second Exemplary Embodiment]

Figure 8:
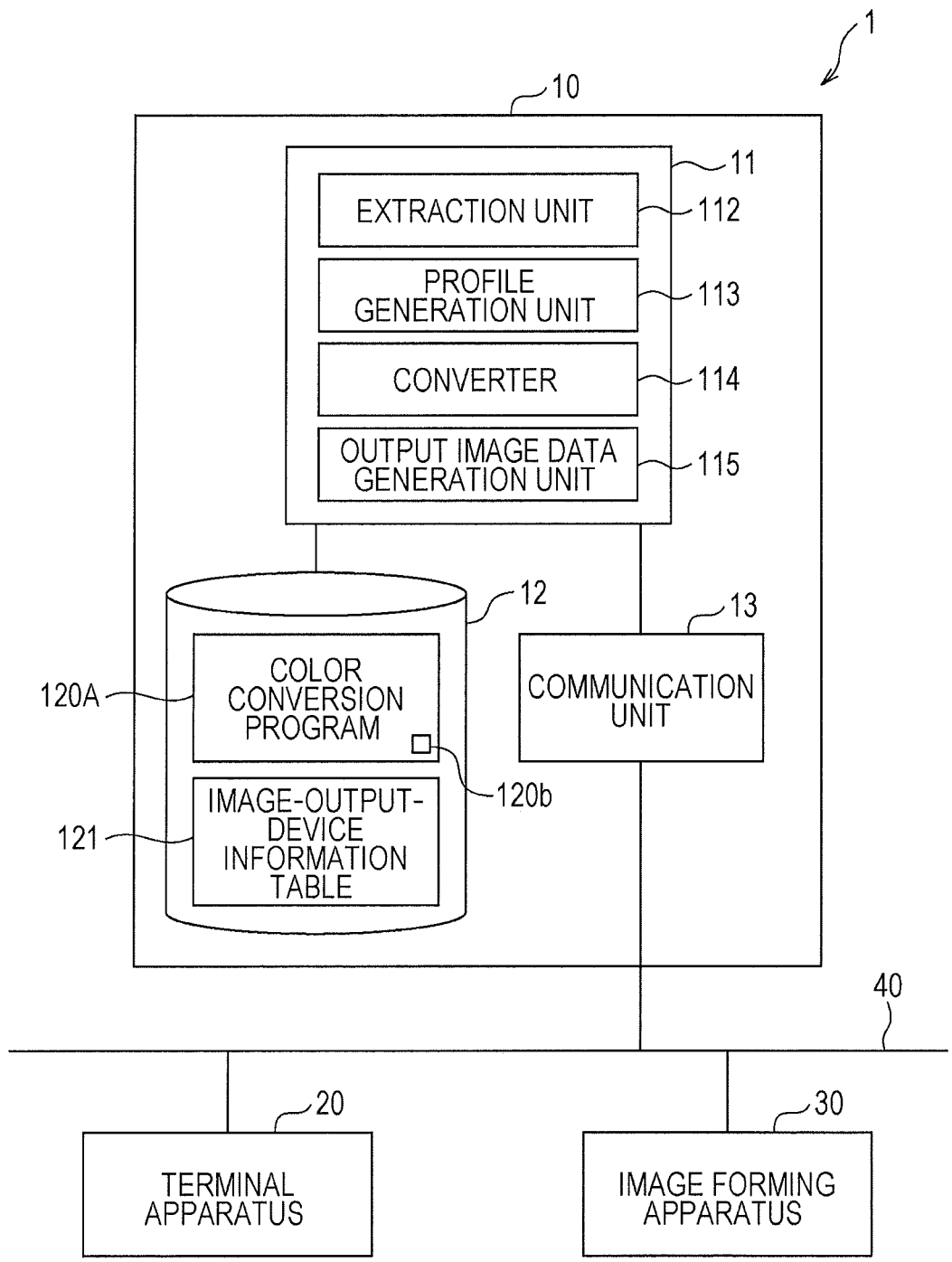
FIG. 8 is a block diagram illustrating an example of a schematic configuration of a printing system according to a second exemplary embodiment of the present invention.

FIG. 8 is a block diagram illustrating an example of a schematic configuration of a printing system according to a second exemplary embodiment of the present invention. FIG. 9 is a block diagram for explaining a function of the server apparatus. FIGS. 10A and 10B illustrate codes inserted into an interpreter and described in a page description language. FIG. 10A is a diagram illustrating a code for extracting the first color space information, and FIG. 10B is a diagram illustrating a code for calling the code of FIG. 10A.

In the first exemplary embodiment, the extraction instruction code is embedded in the input image data 100 by the embedding unit 111 and the first color space information 101 is extracted by executing the embedded extraction instruction code. The second exemplary embodiment differs from the first exemplary embodiment in that an extraction instruction code is not embedded in the input image data 100, an interpreter 120b is prepared in which the extraction instruction code is described, and the first color space information 101 is extracted by executing the interpreter 120b. In the following, points that differ from the first exemplary embodiment will be mainly explained.

The printing system 1 includes the terminal apparatus 20, the server apparatus 10, and the image forming apparatus 30. The server apparatus 10 has a color conversion program 120A including the interpreter 120b that causes the controller 11 to function as the extraction unit 112 or the like.

The controller 11 of the server apparatus 10 functions as the embedding unit 111, the profile generation unit 113, the converter 114, the output image data generation unit 115, and the like by operating in accordance with the color conversion program 120A stored in the memory 12. In addition, the controller 11 functions as the extraction unit 112 by operating in accordance with an extraction instruction code embedded in the interpreter 120b.

The interpreter 120b includes an extraction instruction code described in, for example, Postscript as a page description language (a code D illustrated in FIG. 10A and a code E illustrated in FIG. 10B), and causes the CPU of the controller 11 to operate as in the following. Note that the extraction instruction code included in the interpreter 120b may also be described not in a page description language but in a programming language such as the C language, Java®, PARL, or the like.

When conversion of the CMYK values 102 included in the input image data 100 is started, the controller 11 executes the code D and the code E from the interpreter 120b and redefines a predefined color space setting function. The code D is called from the code E and executed. Note that an operation of the code D is similar to that of the code B illustrated in FIG. 6A, and thus a description thereof will be omitted. In the second exemplary embodiment, when color conversion of the input image data 100 is started, the controller 11 operates in accordance with the flowchart illustrated in FIG. 3 except for step S102.

That is, when conversion of the input image data 100 is executed, the extraction unit 112 (the code E included in the interpreter 120b) determines whether or not the first color space information 101 is set in the input image data 100 (S101). In the case where the extraction unit 112 determines that the first color space information 101 is set in the input image data 100 (Yes in S101), the extraction unit 112 determines that the n-color values included in the input image data 100 are represented as the CMYK values 102 and extracts the first color space information 101 from the input image data 100 by calling an extraction instruction function defined in the code D (S103).

Upon extraction of the first color space information 101 from the input image data 100, the profile generation unit 113 acquires the second color space information 201 from the image-output-device information table 121 (S104) and generates the color conversion profile 300 from the first color space information 101 and the second color space information 201 (S105).

The converter 114 converts the CMYK values 102 included in the input image data 100 using the color conversion profile 300 into the C'M'Y'K' values 202 in the output image data 200 (S106).

In the case where the controller 11 determines that the first color space information 101 is not set in the input image data 100 (No in S101), the output image data generation unit 115 determines that the n-color values included in the input image data 100 are represented as, for example, RGB values, converts the RGB values into coordinate values in the XYZ color system or the like (S109), and further converts the coordinate information obtained as a result of conversion into CMYK values corresponding to the image forming apparatus 30 (S110). Note that the output image data generation unit 115 may also convert the RGB values into CMYK values in accordance with a simple arithmetic expression, without using the XYZ color system.

The output image data generation unit 115 generates the output image data 200 from the C'M'Y'K' values 202 obtained as a result of conversion in step S106 or the CMYK values obtained as a result of conversion in step S110 (S107). The server apparatus 10 transmits the generated output image data 200 to the image forming apparatus 30 (S108).

[Third Exemplary Embodiment]

Figure 11:
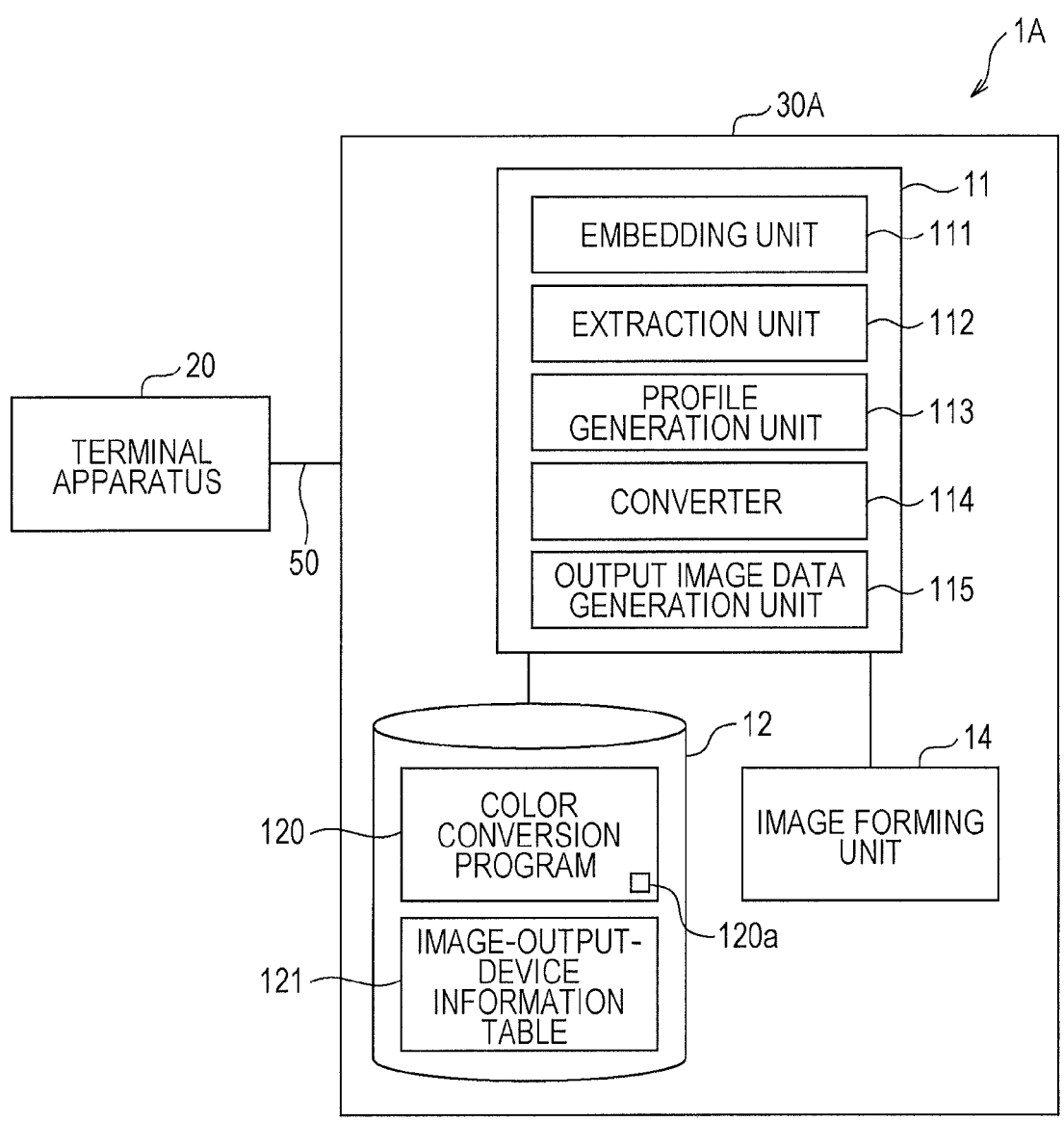
FIG. 11 is a block diagram illustrating an example of a schematic configuration of a printing system according to a third exemplary embodiment of the present invention.

FIG. 11 is a block diagram illustrating an example of a schematic configuration of a printing system according to a third exemplary embodiment of the present invention.

In the first exemplary embodiment, the server apparatus 10 converts the CMYK values 102 in the first color space. The third exemplary embodiment differs from the first exemplary embodiment in that an image forming apparatus 30A has a function for converting the CMYK values 102 in the first color space. In the following, points that differ from the first exemplary embodiment will be mainly explained.

A printing system 1A in the third exemplary embodiment includes the terminal apparatus 20 and the image forming apparatus 30A. The terminal apparatus 20 generates the input image data 100. The image forming apparatus 30A generates the output image data 200 in accordance with the input image data 100 received from the terminal apparatus 20 and outputs a printed material or the like from an output unit 31. The terminal apparatus 20 transmits the input image data 100 to the image forming apparatus 30A via a communication line 50 such as a USB cable or a LAN cable. Note that the terminal apparatus 20 may also transfer the input image data 100 to the image forming apparatus 30A via a storage medium such as a memory card or the like.

The image forming apparatus 30A includes the memory 12, the controller 11, and an image forming unit 14. The memory 12 stores the color conversion program 120, the image-output-device information table 121, and the like. The controller 11 operates in accordance with the color conversion program 120 or the like, and functions as the embedding unit 111, the extraction unit 112, the profile generation unit 113, the converter 114, the output image data generation unit 115, and the like. The image forming unit 14 forms images in accordance with the output image data 200 using, for example, an electrophotographic system and outputs a printed material.

[Modified Example]

Note that exemplary embodiments of the present invention are not limited to the above-described exemplary embodiments, and various modifications are permissible and may be executed without changing the scope of the present invention. For example, the information on the image forming apparatus 30 is replaced with information on a virtual image output device in an operation of the extraction unit 112; however, a configuration may be used with which the first color space information 101 is extracted from the input image data 100 without performance of this replacement.

In addition, the first color space information 101 does not have to be described in a format in which calculation is performed when the input image data 100 are executed, and may also be information, for example, obtained by describing coordinate information or the like in the XYZ color system in the input image data 100.

In addition, for example, without changing the scope of the present invention, one or some of the elements of the above-described exemplary embodiments may be omitted and steps may be added, deleted, changed, switched, or the like in the flowcharts in the above-described exemplary embodiments. In addition, programs used in the above-described exemplary embodiments may also be recorded in computer-readable recording mediums such as CD-ROMs or the like and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process, the process comprising:

extracting first color space information from first image data in which the first color space information and n-color values in a first color space are described in a page description language, the first color space information being information for determining the first color space, which is a target, the first color space information is included in the first image data in a first format when the first image data is executed;

generating a color conversion profile in accordance with the first color space information and second color space information, the first color space information being extracted in the extracting, the second color space information being information for determining a second color space corresponding to output characteristics of an image output device that outputs second image data generated from the first image data, the first color space information is extracted from the first image data in the extracting by processing the first image data and calculating coordinate values in the first color space in a second format different from the first format; and converting the n-color values in the first color space into n-color values in the second color space in accordance with the color conversion profile.

2. The non-transitory computer readable medium according to claim 1, further comprising: embedding a specific code in the first image data, the extracting being performed by the specific code.

3. The non-transitory computer readable medium according to claim 2, wherein in the converting, characteristics of individual colors in the first color space in the first image data are saved and the n-color values in the first color space are converted into the n-color values in the second color space in accordance with the color conversion profile.

4. The non-transitory computer readable medium according to claim 2, wherein
the n-color values are color values of four or more colors including a black color value, and
in the converting, characteristics of a black color in the first color space are saved and the n-color values in the first color space are converted into the n-color values in the second color space in accordance with the color conversion profile.

5. The non-transitory computer readable medium according to claim 1, further comprising: interpreting the first image data,
wherein in the interpreting, a specific code is used to cause the computer to execute the extracting.

6. The non-transitory computer readable medium according to claim 5,
wherein in the converting, characteristics of individual colors in the first color space in the first image data are saved and the n-color values in the first color space are converted into the n-color values in the second color space in accordance with the color conversion profile.

7. The non-transitory computer readable medium according to claim 5, wherein
the n-color values are color values of four or more colors including a black color value, and
in the converting, characteristics of a black color in the first color space are saved and the n-color values in the first color space are converted into the n-color values in the second color space in accordance with the color conversion profile.

8. The non-transitory computer readable medium according to claim 1,
wherein in the converting, characteristics of individual colors in the first color space in the first image data are saved and the n-color values in the first color space are converted into the n-color values in the second color space in accordance with the color conversion profile.

9. The non-transitory computer readable medium according to claim 1, wherein
the n-color values are color values of four or more colors including a black color value, and
in the converting, characteristics of a black color in the first color space are saved and the n-color values in the first color space are converted into the n-color values in the second color space in accordance with the color conversion profile.

10. The non-transitory computer readable medium according to claim 9,
wherein the first color space information and the second color space information are coordinate information in a three-dimensional color space corresponding to the color values of four or more colors.

11. A color conversion apparatus comprising:
an extraction unit, executed by a processor, that extracts first color space information from first image data in which the first color space information and n-color values in a first color space are described in a page description language, the first color space information being information for determining the first color space, which is a target, the first color space information is included in the first image data in a first format when the first image data is executed;
a profile generation unit, executed by a processor, that generates a color conversion profile in accordance with the first color space information and second color space information, the first color space information being extracted by the extraction unit, the second color space information being information for determining a second color space corresponding to output characteristics of an image output device that outputs second image data generated from the first image data, the first color space information is extracted from the first image data in the extracting by processing the first image data and calculating coordinate values in the first color space in a second format different from the first format; and
a converter that converts the n-color values in the first color space into n-color values in the second color space in accordance with the color conversion profile.

12. A color conversion method comprising:
extracting first color space information from first image data in which the first color space information and n-color values in a first color space are described in a page description language, the first color space information being information for determining the first color space, which is a target, the first color space information is included in the first image data in a first format when the first image data is executed;
generating a color conversion profile in accordance with the first color space information and second color space information, the first color space information being extracted in the extracting, the second color space information being information for determining a second color space corresponding to output characteristics of an image output device that outputs second image data generated from the first image data, the first color space information is extracted from the first image data in the extracting by processing the first image data and calculating coordinate values in the first color space in a second format different from the first format; and
converting the n-color values in the first color space into n-color values in the second color space in accordance with the color conversion profile.

* * * * *